Jan. 23, 1968

SHIGEO ISHIOKA 3,364,759

STEPLESS CHANGE SPEED TRANSMISSION WITH
ADJUSTABLE THROW CRANK MECHANISM

Filed April 14, 1966

INVENTOR
SHIGEO ISHIOKA

BY Wenderoth, Lind & Ponack

ATTORNEYS

__United States Patent Office__

3,364,759
Patented Jan. 23, 1968

3,364,759
STEPLESS CHANGE SPEED TRANSMISSION WITH ADJUSTABLE THROW CRANK MECHANISM
Shigeo Ishioka, 3–3 Yamate-dori, Showa-ku, Nagoya-shi, Japan
Continuation-in-part of application Ser. No. 268,797, Mar. 28, 1963. This application Apr. 14, 1966, Ser. No. 542,669
Claims priority, application Japan, Apr. 6, 1962, 37/13,993
4 Claims. (Cl. 74—117)

This application is a continuation-in-part of my copending application Ser. No. 268,797, filed Mar. 28, 1963, now abandoned.

The crank in a crank mechanism is the part of a mechanism for transforming a rotational movement into a reciprocal linear movement or into a reciprocal angular movement. If the length of the crank arm is variable, the length of the stroke of the reciprocal linear movement or of the reciprocal angular movement in relation to one rotation of the crank can be moved.

The present invention is directed to a crank mechanism in which the length of the crank arm can be changed continuously while the crank is in rotation. The mechanism according to the present invention can be applied to many types of apparatus, such as a stepless change gear, a torque converter, an apparatus for changing the stroke of the piston of an internal combustion engine, and an apparatus for changing the stroke of the horizontal oscillating movement of electric fan.

The invention will be described hereinafter with reference to accompanying drawings, in which.

Figure 1:
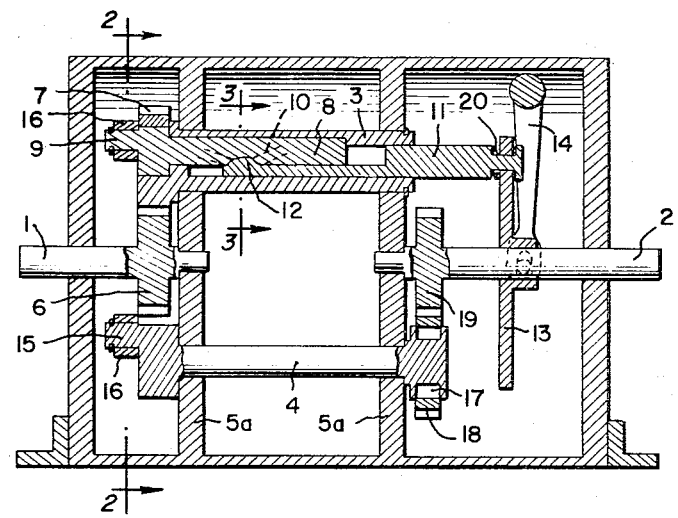
FIG. 1 is a longitudinal cross sectional view of a stepless change gear incorporating the crank mechanism according to the present invention.
Figure 2:
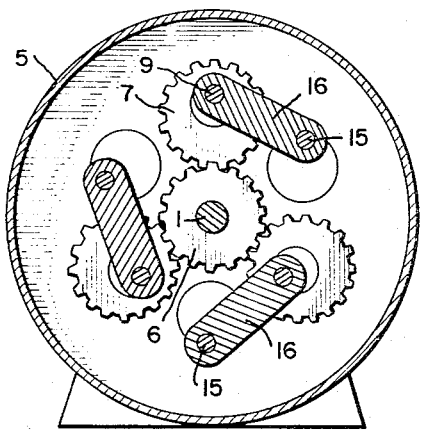
FIG. 2 is a horizontal cross sectional view on line 2—2 of FIG. 1.
Figure 3:
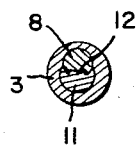
FIG. 3 is a horizontal cross sectional view taken on line 3—3 of FIG. 1.

FIG. 1 through FIG. 5 show a stepless change gear which includes an adjustable throw crank mechanism according to the present invention, and the theory of the present invention will be described hereinafter based on these figures. First, the construction and operation of the apparatus as shown in FIG. 1 will be described. A driving shaft 1 is adapted to be connected to a suitable prime mover, and a driven shaft 2 is adapted to be connected to a driven machine and is coaxial with the driving shaft. A plurality, in this case three, of crankshafts 3 are rotatably mounted in interior walls 5a of housing 5 and are disposed at equal distances around the axis of shafts 1 and 2. A corresponding plurality of rocking shafts 4 are also mounted in walls 5a and are disposed at equal distances around the axis of shafts 1 and 2.

A sun gear 6 is fixed to driving shaft 1, and each crankshaft 3 has a gear 7 fixed thereon which is in mesh with said sun gear 6. An inner crankshaft 8 is rotatably mounted within each crankshaft 3, the axis of rotation of each said inner crankshaft being eccentric to that of the crankshaft within which it is positioned. A crank pin 9 is affixed to each inner crankshaft 8. The relationship among the axis of rotation of crankshaft 3, the axis around which inner crankshaft 8 and the center of crank pin 9 rotates will be described later. A helical guide groove 10 is provided on the outer circumferential surface of each inner crankshaft 8 and extends about 180 degrees (half the length of the pitch of said groove). An eccentric throw-adjusting rod 11 is slidably positioned in each crankshaft 3 and rotates with the crankshaft 3. A projection 12 is provided on each eccentric throw-adjusting rod 11 and is engaged in said guiding groove 10. Each inner crankshaft 8 will rotate in a clockwise or counter-clockwise direction an amount less than 180 degrees within the crankshaft 3 when the eccentric throw-adjusting rods 11 are moved in one direction or the other along crankshaft 8. The ratio of the diameter of the inner crankshaft 8 and the pitch of the helical guiding groove 10 must be determined by taking into consideration the maximum static friction coefficient and a value must be chosen which makes movement possible under no load conditions. This is to say, when the crank pin 9 is not under load, the eccentric throw-adjusting rod 11 should move so as to rotate the inner crankshaft 8 through an angular movement less than 180 degrees. However, when the crank pin 9 is given a torque while the crankshaft 3 is fixed, the value of the static friction coefficient must be such that the eccentric throw-adjusting rod 11 does not move in either direction along the inner crankshaft 8. An adjusting disc 13 is engaged with the ends of the eccentric throw-adjusting rods 11, said adjusting disc being engaged by a lever 14 which is disposed in the housing 5 so that the eccentric throw-adjusting rods 11 are caused to move in the axial direction of the crankshafts 3 when the lever 14 is moved. A rocking pin 15 is mounted on the end of each rocking shaft 4, and each crank pin 9 is connected to a corresponding rocking pin by means of a link 16. The rocking shafts 4 will be reciprocated through less than a complete rotation with the rotation of the crankshaft 3. The inner race of one-way clutch device 17 is affixed to the end of each rocking shaft 4 at the opposite end from the rocking pin 16, and a driven outer gear 18 is mounted on the outer race of the one-way clutch device 17. A driven gear 19 which is in mesh with said driven outer gear 18 is mounted on said driven shaft 2.

The meshing of sun gear 6 and the three gears 7 is arranged so that the reciprocal movement of each rocking shaft 4 is 120 degrees out of phase with each of the other two rocking shafts.

When the driving shaft 1 is rotated, the crankshafts 3 are caused to rotate so as to oscillate the rocking shafts 4. However, the driven gear 19 transmits torque to the driven shaft 2 by means of one-way clutch device 17 only when one of the rocking shafts is rotated in a certain direction. The driven shaft 2 is nevertheless continuously supplied with torque because the three rocking shafts are 120° out of phase with each other. The present invention resides in the crankshaft 3 and the parts associated therewith and the details thereof are described below.

Figure 4:
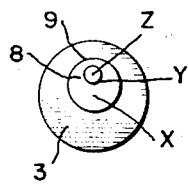
FIGS. 4 and 5 are diagrammatic end views showing the relationship among the crankshaft, inner crankshaft and crank pin of the apparatus of FIG. 1.
Figure 5:
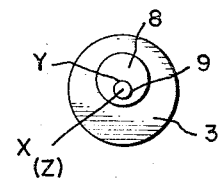

FIGS. 4 and 5 show the relationship among the crankshaft 3, the inner shaft 8 and crank pin 9. In the drawings, X designates the axis of rotation of the crankshaft 3, and Y is the axis of rotation of crankshaft 8, and Z is the center of crank pin 9, the spacing of the points being such that $XY=YZ$.

Furthermore, the crankshaft 3, rocking shaft 4, crank pin 9, rocking pin 15 and link 16 constitute a 4-part chain connection in the crank mechanism in which the distance XZ in the FIG. 4 is the length of the crank arm, i.e. is the eccentric throw. To adjust eccentric throw by adjusting the length of the crank arm is the object of the present invention. FIG. 4 shows the condition where the eccentric throw-adjusting rod 11 has been moved to the left into crankshaft 3 as far as it can go, and therefore the center Z of crank pin 9 is spaced as far as possible from the axis of rotation X of the crankshaft 3. That is to say, the eccentric throw is the maximum value. Next, when the eccentric throw-adjusting rod 11 is moved to the right by means of the lever 14, the inner crankshaft 8 is rotated in the crankshaft 3 and simultaneously the center Z of the crank pin approaches the axis of rotation X of the crankshaft 3 while the rotation is continued. In other words, the eccentric throw is gradually decreased. When the eccentric throw-adjusting rod 11 is shifted as far as it can go in the right direction, points X and Z coincide as shown in FIG. 5, and the eccentric throw becomes zero. Accordingly, in the present apparatus, the eccentric throw is adjusted by moving the lever 14, thereby to adjust the stroke of reciprocal rotational movement of the rocking shaft 4, and therefore the present apparatus functions as a stepless change gear.

When the torque is applied to the inner crankshaft 8 due to a load being driven, the inner crankshaft will not rotate within the crankshaft 3 even though an effort is made to move the lever 14 because the friction between the guiding groove 10 and projection 12 will be increased. According to the present apparatus, however, when torque is not applied to the inner crankshafts 8 and not transmitted to the output shaft because of reciprocal angular movement of the rocking shafts 4 and the one-way clutch devices 17, the inner crankshaft can be rotated and adjustment of the eccentric throw can be effected. An adjusting spring 20 is provided between each eccentric throw-adjusting rod 11 and adjusting disc 13 to smooth the production of the above adjustment. That is to say, when the lever 14 is operated, and the adjusting disc 13 applies pressure on the eccentric throw-adjusting rods 11, and a torque depending on the load is applied to one of the inner crankshafts 8 accidentally, the corresponding adjusting spring 20 is compressed when the particular eccentric throw-adjusting rod 11 is locked. However, when the direction of rotation of the corresponding rocking shaft 4 is reversed, no torque is applied to the corresponding inner crankshaft 8, and the eccentric throw-adjusting rod 11 starts to move under the action of the compressed adjusting spring 20.

However, the adjusting spring 20 is not required due to the presence of such factors as bending of the material of the eccentric throw-adjusting rods 11 and other such factors. Furthermore, where wear between the eccentric throw-adjusting rods 11 and adjusting disc 13 is a factor, thrust bearings or the like can be provided. Also, more than one guide groove 10 can be provided in which case a corresponding number of projections 12 must be provided.

Figure 6:
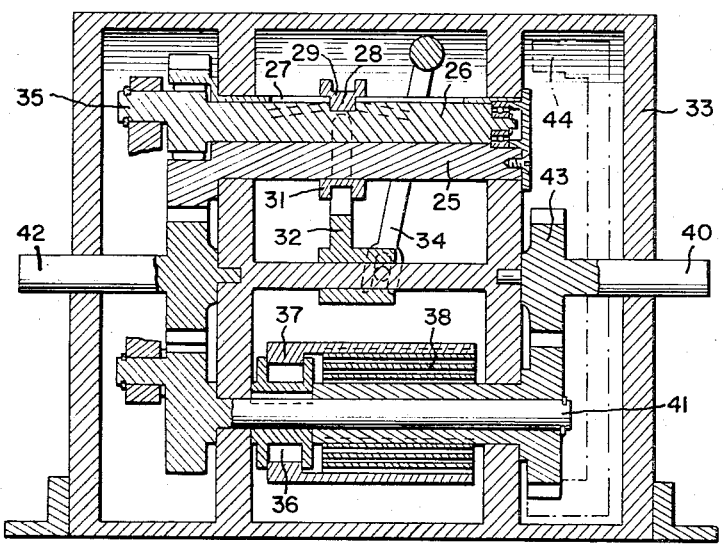
FIG. 6 is a longitudinal cross sectional view of a modified form of the apparatus as shown in FIG. 1.

FIG. 6 illustrates an embodiment of the present invention as incorporated in a torque converter, the crankshafts which form part of the present invention are modified as compared with that shown in FIG. 1. In the apparatus according to FIG. 1, the eccentric throw-adjusting rod 11 which causes the inner crankshaft 8 to rotate within each crankshaft 3 is positioned within the crankshaft 3, but in the apparatus shown in FIG. 6, it is positioned on the outer circumference of each crankshaft 25 and forms part of an eccentric throw-adjusting ring 29.

In FIG. 6, similar to the embodiment shown in FIG. 1, an inner crankshaft 26 is loosely mounted in each crankshaft 25 so that it is free to rotate relative to crankshaft 25 and at least one longitudinal groove 27 is provided in each crankshaft 25. The width of said longitudinal groove is equal to the width of the projection 28 depending from an eccentric throw-adjusting ring 29 loosely mounted around the outer circumference of each crankshaft 25. Ring 29 is movable in the axial direction of the crankshafts 25, and the projection 28 is also engaged in a helical guiding groove 30 in the inner crankshaft 26. Guiding discs 31 are provided on the eccentric throw-adjusting ring 29, and an adjusting disc 32 is engaged between said guiding discs. A lever 34 mounted on housing 33 is coupled with said adjusting disc, and said adjusting discs 32 and rings 29 are shifted by moving the lever to cause the eccentric throw-adjusting rings 29 to move in the axial direction of the crankshafts 25. By means of this arrangement and movement of the lever 34, the eccentric throw of the crank pins 35 is varied.

In the apparatus shown in FIG. 1, a driven outer gear 18 is affixed to the outer race of one-way clutch device 17, but in the apparatus shown in FIG. 6, a spring 38, shown in the drawing as a coil spring, is affixed to the outer race 37 of each one-way clutch device 36, and the other end of said spring 38 is affixed to a driven outer gear 39.

Where a driven shaft 40 cannot be rotated because of an excessive load applied to the driven shaft, in the apparatus shown in FIG. 1, the driving shaft 1 is caused to stop, but in the apparatus shown in FIG. 6, repeated bending of the springs 38 occurs and the driving shaft 42 does not stop.

Accordingly, in the apparatus shown in FIG. 1, the position of the lever 14 and the ratio of the speed of rotation of the driven shaft 2 to that of the driving shaft 1 constitutes one dimensional relationship, but in the apparatus shown in FIG. 6, the ratio of said speeds of rotation is variable according to size of the load.

That is to say, the FIG. 1 device operates as a stepless change gear while the FIG. 6 device operates as a torque converter which will lose speed. The coupling of driven outer gears 39 and driven shaft 40 need not be by external gear 43 as shown in the drawing, but can be through an internal gear 44 which is shown in FIG. 6 in dotted lines. The relationship of the sun gear on the drive shaft 42 and outer gears on the crankshafts as shown in FIGS. 1 and 6 can be the same.

Also, in the apparatus of FIG. 1, as a means of reducing the uneven motion of the torque of the driven shaft 2, conventional means can be provided such as insertion of a buffer spring between the driven shaft gear 19 and the driven shaft 2 or provision of a flywheel of a suitable type on the driven shaft.

Figure 7:
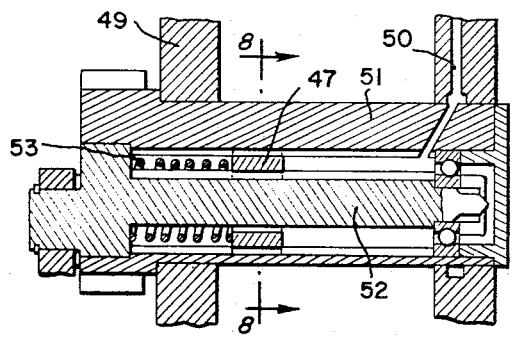
FIG. 7 is a sectional view of a modified form of the crankshaft portion of the apparatus of FIG. 1.
Figure 8:
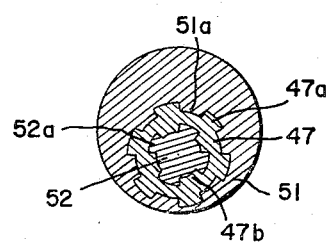
FIG. 8 is a cross section taken on line 8—8 of FIG. 7.

FIG. 7 illustrates a modified crankshaft according to the present invention. In the apparatus, an eccentric throw-adjusting core 47 is the part corresponding to the eccentric throw-adjusting rod 11 shown in FIG. 1. The adjusting disc 13 and lever 14 which actuate the eccentric throw-adjusting rod 11 in the FIG. 1 in the direction of the axis of crankshaft 3 are replaced by hydraulic pressure which is supplied through an oil groove 50 located in the housing 49. The eccentric throw-adjusting core 47 has outwardly extending projections 47a engaging between 51a on the inner surface of a crankshaft 51. Core 47 also has inwardly extending projections 47b engaging between threads 52a on the outer surface of an inner crankshaft 52. One of the threads 51a and 52a is a clockwise thread and the other is a counterclockwise thread. Alternatively one of the two threads can be parallel to the axis of the shafts, and can be lands defining longitudinal grooves.

The thread provided on the outer surface of said inner crankshaft 52 corresponds to the guiding groove 10 in FIG. 1 and the thread provided in the inner surface of said eccentric throw-adjusting core 47 corresponds to the projection 12 in FIG. 1. A restoring spring 53 is provided between core 47 and the end of inner crankshaft 52 to provide a balance for the oil pressure. In order to cause the eccentric throw-adjusting core 47 to move, mechanical means similar to those shown in FIG. 1 or FIG. 6 can also be used.

The features of the present invention are believed to be clear from the three foregoing embodiments, but in summary thereof the eccentric throw-adjusting rod 11 in FIG. 1, the eccentric throw-adjusting ring 29 in FIG. 6 and the eccentric throw-adjusting core 47 in FIG. 7 are identical with respect to their function, and these three devices can be called the eccentric throw-adjusting members.

According to the present invention, the inner crankshaft is positioned within the crankshaft and is free to rotate within the crankshaft, and the axis of rotation of the crankshaft is eccentric to the axis of rotation of the inner crankshaft. The crank pin is mounted on the inner crankshaft, but the axis of rotation of the inner crankshaft is eccentric to the center of the crank pin.

The eccentric throw-adjusting member is movable along the crankshaft parallel to the axis of rotation. At least one guiding groove is provided in the inner crankshaft, and a projection on the eccentric throw-adjusting member engages in said guiding groove to cause the eccentric throw-adjusting member to rotate in inner crankshaft back and forth about 180 degrees when the eccentric throw-adjusting member is moved in the axial direction of the crankshaft. The pitch of the guiding groove is such that when a torque is applied between the crankshaft and the inner crankshaft, the eccentric throw-adjusting member cannot shift in the axial direction of the crankshaft. By means of the apparatus provided in the housing, the eccentric throw-adjusting member can be moved.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

I claim:

1. A crank mechanism having a variable eccentric throw comprising a crankshaft, an inner crankshaft rotatably mounted in said crankshaft with the axis of rotation of said crankshaft being parallel and eccentric to the axis of rotation of said inner crankshaft, a crank pin affixed to said inner crankshaft, the center of rotation of said crank pin being eccentric to the axis of rotation of said inner crankshaft, and an elongated eccentric throw-adjusting member slidable within said crankshaft and parallel to the axis of said crankshaft, said inner crankshaft having at least one substantially helical guiding groove therein, a projection on said throw-adjusting member engaged in said guiding groove, said inner crankshaft being reciprocally rotatable through an angle of about 180 degrees within said crankshaft by the movement of said eccentric throw-adjusting member in the axial direction of said crankshaft, moving means operatively associated with said eccentric throw-adjusting member for moving it in the direction of the axis of said crankshaft, and a resilient means between said moving means and said throw-adjusting member.

2. A torque transmitting device comprising, a driving shaft, a driven shaft coaxial therewith, at least one rocking shaft parallel to said driving and driven shafts, a variable eccentric throw comprising a crankshaft, an inner crankshaft rotatably mounted in said crankshaft with the axis of rotation of said crankshaft being parallel and eccentric to the axis of rotation of said inner crankshaft, a crank pin affixed to said inner crankshaft, the center of rotation of said crank pin being eccentric to the axis of rotation of said inner crankshaft, and an eccentric throw-adjusting member loosely mounted in operative relationship with said crankshaft and movable in the direction of rotation of and in a direction the same as the direction of the axis of said crankshaft, said inner crankshaft having at least one guiding groove therein, a projection on said throw-adjusting member engaged in said guiding groove, said inner crankshaft being reciprocally rotatable through an angle of about 180 degrees within said crankshaft by the movement of said eccentric throw-adjusting member in the axial direction of said crankshaft, moving means operatively associated with said eccentric throw-adjusting member for moving it in the direction of the axis of said crankshaft, a housing in which said driving shaft, said driven shaft and said rocking shaft are rotatably mounted, said crankshaft being mounted in said housing parallel to said driving and driven shaft, a sun gear mounted on said driving shaft, a gear meshing with said sun gear and mounted on said crankshaft, a rocking pin mounted on said rocking shaft, a link connecting said rocking pin to said crank pin so that said rocking shaft rocks when said crankshaft rotates, and one-way clutch means coupling said rocking shaft to said driven shaft for transmitting torque to said driven shaft only when said rocking shaft is rotating in one direction.

3. The combination as claimed in claim 2 in which said one-way clutch device is mounted on said rocking shaft and has an outer race, a driven outer gear on the outer race of said one-way clutch device, and a driven gear meshing with said driven outer gear and mounted on said driven shaft.

4. The combination as claimed in claim 2 in which said one-way clutch device is mounted on said rocking shaft, a driven gear mounted on said driven shaft, a driven outer gear meshing with said driven gear and rotatably mounted on said rocking shaft, and at least one spring coupled between said one-way clutch device and said driven outer gear.

References Cited

UNITED STATES PATENTS

| 977,449 | 12/1910 | Hayden | 74—117 |
| 1,304,955 | 5/1919 | Fowler | 74—470 |
| 2,590,547 | 3/1952 | Kolko | 74—116 |
| 3,130,603 | 4/1964 | Gessner | 74—600 |
| 3,229,549 | 1/1966 | Riedl | 74—117 X |

MILTON KAUFMAN, *Primary Examiner.*